United States Patent [19]

Sorensen

[11] Patent Number: 5,030,406
[45] Date of Patent: Jul. 9, 1991

[54] SEQUENTIALLY INJECTED MULTI-COMPONENT SHUTTLE-STACK-MOLDING

[76] Inventor: Jens O. Sorensen, P.O. Box 2274, Rancho Santa Fe, Calif. 92067

[21] Appl. No.: 394,228

[22] Filed: Aug. 14, 1989

[51] Int. Cl.[5] .................. B29C 45/10; B29C 45/12; B29C 45/16
[52] U.S. Cl. .................. 264/255; 264/297.2; 264/328.8; 264/328.11; 425/129.1; 425/130; 425/134
[58] Field of Search .................. 264/255, 297.2, 328.7, 264/328.8, 328.11; 425/129.1, 129.2, 130, 134

[56] References Cited

U.S. PATENT DOCUMENTS

| 4,400,341 | 8/1983 | Sorensen | 264/328.8 |
| 4,744,741 | 5/1988 | Glover et al. | 264/328.8 |
| 4,885,121 | 12/1989 | Patel | 264/255 |
| 4,935,184 | 6/1990 | Sorensen | 264/255 |

FOREIGN PATENT DOCUMENTS

| 56-69138 | 6/1981 | Japan | 264/255 |
| 59-73930 | 4/1984 | Japan | 264/328.8 |

*Primary Examiner*—Jill L. Heitbrink
*Attorney, Agent, or Firm*—Edward W. Callan

[57] ABSTRACT

A method of cyclic injection molding enables production of four or more products in each production cycle while the filling of each mold cavity may be separate and therefore may be fully controlled. Multicomponent products are molded in an injection molding system that includes a mold positioning system, a first injection system and a second injection system, and a left molding block, a right molding block and an intermediate molding block located between the left and the right molding blocks, with the blocks being disposed along a common axis for axial movement in respect to each other. The left molding block defines a first left general mold cavity part and the intermediate molding block defines a first left gated mold cavity part and a second left gated mold cavity part. The right molding block defines a first right general mold cavity part and the intermediate molding block defines a first right gated mold cavity part and a second right gated mold cavity part. The mold positioning system combines the molding blocks so that the first left general mold cavity part is connected with the first left gated mold cavity part to form a first left mold cavity, the first right general mold cavity part is connected with the first right gated mold cavity part to form a first right mold cavity, the first left general mold cavity part is connected with the second left gated and mold cavity part to form a second left mold cavity, which encompasses the first left plastic component, and the first right general mold cavity part is connected with the second right gated mold cavity part to form a second right mold cavity, which encompasses the first right plastic component.

3 Claims, 4 Drawing Sheets

SEQUENTIALLY INJECTED MULTI-COMPONENT SHUTTLE-STACK-MOLDING

BACKGROUND OF THE INVENTION

The present invention generally pertains to a method of injection molding of plastic products and is particularly directed to a highly efficient and highly controlled method of injection molding multi-component plastic products.

Heretofore injection molding of multi-component plastic products were either carried out so that only two product were produced in each injection molding cycle, with the resulting low efficiency, or alternatively so that at least two mold cavities were filled at the same time by the same injection unit, giving rise to unbalanced filling of the cavities. A production cycle is here defined to mean a period including two sequential injection periods.

The present invention enables production of four or more products in each production cycle while the filling of each cavity may be separate and therefore may be fully controlled.

SUMMARY OF THE INVENTION

A first aspect of the present invention provides a method of cyclic injection molding a multicomponent product in an injection molding system comprising a mold positioning system, a first injection system and a second injection system, and a left molding block, a right molding block and an intermediate molding block located between the left and the right molding blocks, said blocks being disposed along a common axis for axial movement in respect to each other, the left molding block defining a first left general mold cavity part and the intermediate molding block defining a first left gated mold cavity part and a second left gated mold cavity part, the right molding block defining a first right general mold cavity part and the intermediate molding block defining a first right gated mold cavity part and a second right gated mold cavity part, the intermediate molding block defining a first runner system and a second runner system connected to said gated mold parts, the method comprising the steps of:
  (a) combining by the mold positioning system said molding blocks so that the first left general mold cavity part is connected with the first left gated mold cavity part to form a first left mold cavity,
  (b) injecting by the first injection system via the first runner system a first fluid plastic material into the first left mold cavity, and solidifying the material to produce a first left plastic component,
  (c) separating by the mold positioning system the right and center molding blocks,
  (d) combining by the mold positioning system said molding blocks so that the first right general mold cavity part is connected with the first right gated mold cavity part to form a first right mold cavity,
  (e) injecting by the first injection system via the first runner system first fluid plastic material into the first right mold cavity, and solidifying the material to produce a first right plastic component,
  (f) separating by the mold positioning system the left and center molding blocks, retaining the first left plastic component on the first left general mold cavity part,
  (g) combining by the mold positioning system said molding blocks so that the first left general mold cavity part is connected with the second left gated mold cavity part to form a second left mold cavity, which encompasses said first left plastic component,
  (h) injecting by the second injection system via the second runner system a second fluid plastic material into the second left mold cavity so that the second fluid plastic is united with the first left plastic component and solidifying the material to mold a first left multicomponent plastic product,
  (i) separating by the mold positioning system the right and center molding blocks, retaining the first right plastic component on the first right general mold cavity part,
  (j) combining by the mold positioning system said molding blocks so that the first right general mold cavity part is connected with the second right gated mold cavity part to form a second right mold cavity, which encompasses said first right plastic component,
  (k) injecting by the second injection system via the second runner system second fluid plastic material into the second right mold cavity so that the second fluid plastic is united with the first right plastic component and solidifying the material to mold a first right multicomponent plastic product,
  (l) separating by the mold positioning system the left and center molding blocks, to eject the first left product molded in step (h),
  wherein step (c) comprises the step of
  (m) ejecting a first right product molded in step (k) of the preceding molding cycle.

Another aspect of the present invention provides a method wherein additionally the left molding block defines at least one second left general mold cavity part and the right molding block defines at least one second right general mold cavity part, and additionally comprising the steps of:
  wherein step (g) comprises the step of
  (n) combining by the mold positioning system said molding blocks so that one of said at least one second left general mold cavity parts is connected with the first left gated mold cavity part to form a third left mold cavity,
  wherein step (h) comprises the step of
  (o) injecting by the first injection system via the first runner system first fluid plastic material into the third left mold cavity, and solidifying the material to produce a second left plastic component,
  wherein step (i) comprises the step of
  (p) separating by the mold positions system the right and center molding blocks,
  wherein step (j) comprises the step of
  (q) combining by the mold positioning system said molding blocks so that one of said at least one second right general mold cavity parts is connected with the first right gated mold cavity part to form a third right mold cavity,
  wherein step (k) comprises the step of
  (r) injecting by the first injection system via the first runner system first fluid plastic material into said third right mold cavity, and solidifying the material to produce a second right plastic component,
  wherein step (l) comprises the step of (s) separating by the mold positioning system the left and center molding blocks, retaining the second left plastic component on said one of said at least one second left general mold cavity parts, wherein step (a) of the following cycle comprises the step of (t) combining by the mold positioning system said molding blocks so that any one of said at least one second left general mold cavity parts is connected with the second left gated mold cavity part to form a fourth left mold cavity, which encompasses said second left plastic component, wherein step (b) of the following cycle comprises the step of (u) injecting by the second injection system via the second runner system second fluid plastic material into the fourth left mold cavity so that the second fluid plastic is united with the second left plastic component and solidifying the material to mold a second left multicomponent plastic product, wherein step (c) of the following cycle comprises the step of (v) separating by the mold positioning system the right and center molding blocks, retaining the second right plastic component on said specific second right general mold cavity part, wherein step (d) of the following cycle comprises the step of (w) combining by the mold positioning system said molding blocks so that said any one of said at least one second right general mold cavity parts is connected with the second right gated mold cavity part to form a fourth right mold cavity, which encompasses said second right plastic component, wherein step (e) of the following cycle comprises the step of (x) injecting by the second injection system via the second runner system second fluid plastic material into the fourth right mold cavity so that the second fluid plastic is united with the second right plastic component and solidifying the material to mold a second right multicomponent plastic product, wherein step (f) of the following cycle comprises the step of (y) separating by the mold positioning system the left and center molding blocks, to eject the second left product molded in step (u), wherein step (p) comprises the step of (z) ejecting a second right product molded in step (e).

Additional features of the present invention are described in relation to the description of the preferred embodiments.

DESCRIPTION OF THE PREFERRED EMBODIMENT

Figure 1:
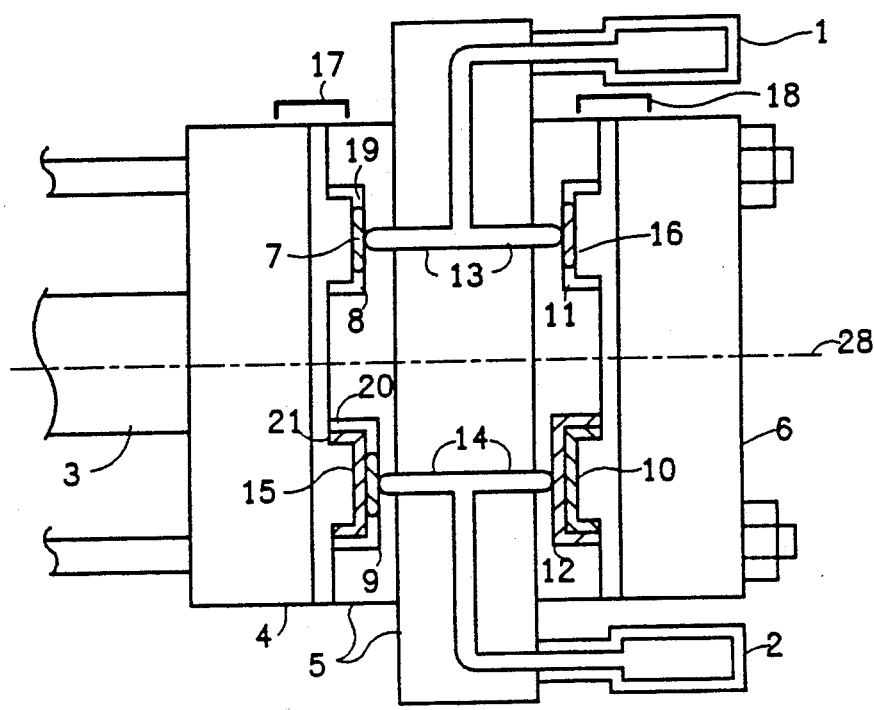
FIGS. 1 through 8 shows within a cycle four chronological top sectional views of an injection molding system used for operating the cyclical method of the invention.

Referring to FIGS. 1 through 8 showing an injection molding system being a standard injection molding machine with two independent standard injection units 1, 2. The injection molding system comprises a mold positioning system 3 being a standard clamping unit and a left and a right locking means 17, 18 for locking the left molding block 4 together with the intermediate molding block 5 or for locking the right molding block 6 together with the intermediate molding block 5 respectively. A left molding block 4, a right molding block 6, and an intermediate molding block 5, located between the left and the right molding blocks 4, 6 are disposed for axial movement in respect to each other.

The left molding block 4 defines a first left general mold cavity part 7, a second left general mold cavity part 15 and the intermediate molding block 5 defines a first left gated mold cavity part 8 and a second left gated mold cavity part 9.

The right molding block 6 defines a first right general mold cavity part 10, a second right general mold cavity part 16 and the intermediate molding block defines a first right gated mold cavity part 11 and a second right gated mold cavity part 12.

The intermediate molding block 5 defines a first runner system 13 connected to the first left gated mold cavity part and the first right gated mold cavity part 8, 11 and further defines a second runner system 14 connected to the second left gated mold cavity part and the second right gated mold cavity part 9, 12.

The method comprises the following steps:

FIG. 1. Combining by the mold positioning system 3 the molding blocks 4, 5, 6 so that the first left general mold cavity part 7 is connected with the first left gated mold cavity part 8 to form a first left mold cavity 19 and so that the second left general mold cavity part 15 is connected with the second left gated mold cavity part 9 to form a fourth left mold cavity 20, which encompasses a left plastic component 21 formed in the previous production cycle.

Injecting by the first injection system 1 via the first runner system 13 a first fluid plastic material into the first left mold cavity 19, and solidifying the material to produce a first left plastic component 22 and approximately at the same time injecting by the second injection system 2 via the second runner system 14 a second fluid plastic material into the fourth left mold cavity 20, so that the second fluid plastic is united with the second left plastic component 21, and solidifying the material to mold a second left multicomponent plastic product 23.

Figure 2:
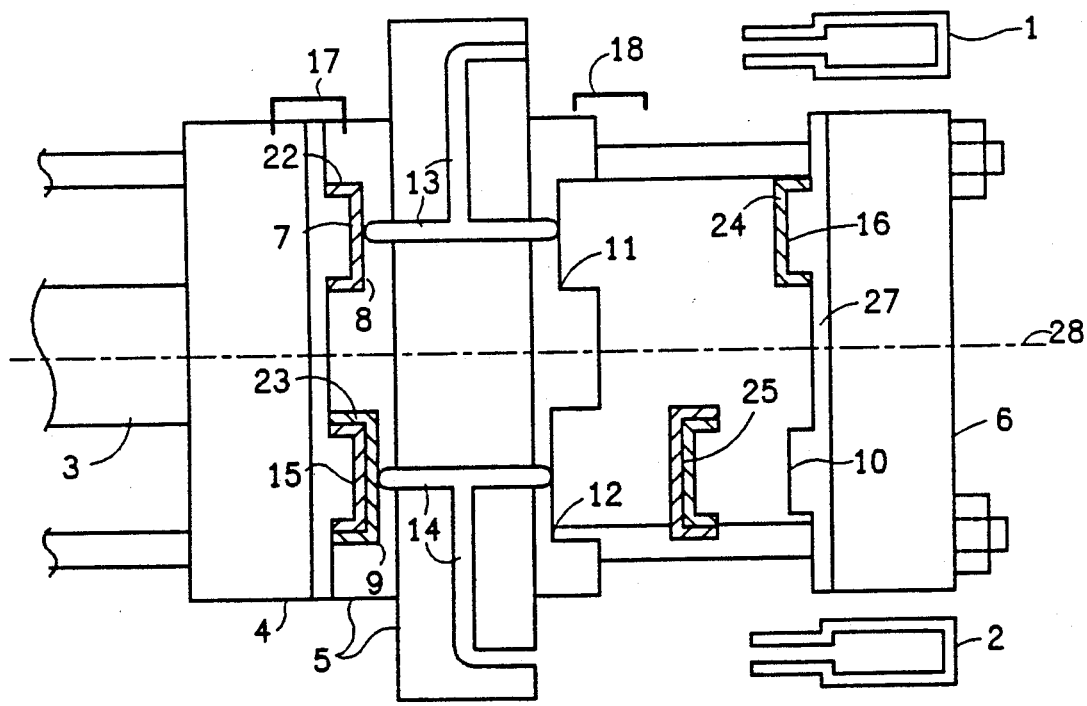

FIG. 2. While locking together the left and intermediate molding blocks 4, 5 and by the left locking means 17, separating by the mold positioning system 3 the right and intermediate molding blocks 6, 5 and retaining a second right plastic component 24 formed in the previous cycle on the second right general mold cavity part 16, and ejecting a first right product 25 molded in the previous production cycle.

Rotating revolvable section 27 of the right molding block 6 pivoting around the center axis 28 of the injection molding system by a right rotational means, not shown, and combining by the mold positioning system 3 molding blocks 4, 5, 6 so that the first right general mold cavity part 10 is connected with the first right gated mold cavity 11 to form a first right mold cavity 29, and so that the second right general mold cavity part 16 is connected with the second right gated mold cavity part 12 to form a fourth right mold cavity 30, which encompasses the second right plastic component 24.

Figure 3:
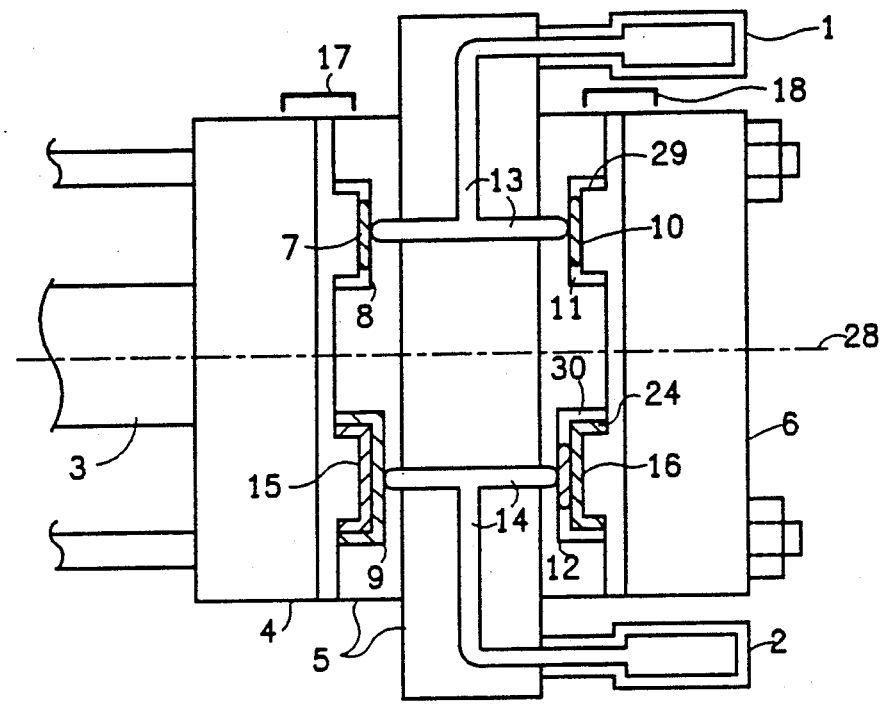

FIG. 3. Injecting by the first injection system 1 via the first runner system 13 first fluid plastic material into the first right mold cavity 29, and solidifying the material to produce a first right plastic component 24a and approximately at the same time injecting by the second injection system 2 via the second runner system 14 second fluid plastic material into the fourth right mold cavity 30 so that the second fluid plastic is united with the second right plastic component 24 and solidifying the material to mold a second right multicomponent plastic product 25a.

Figure 4:
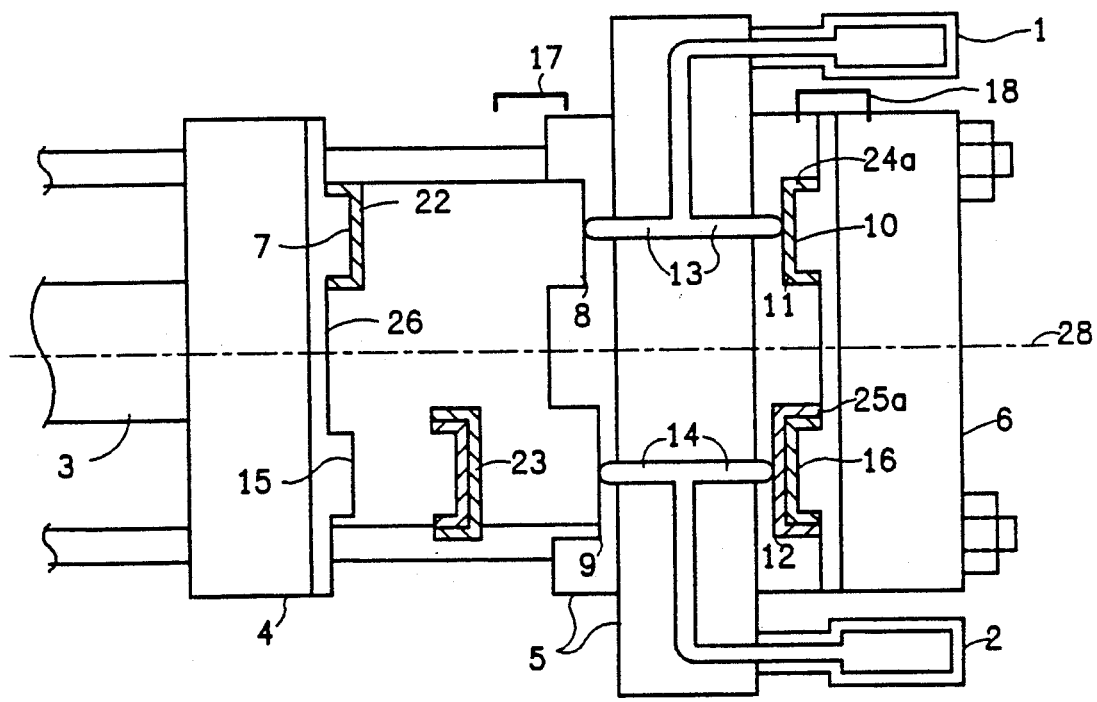

FIG. 4. While locking together the right and intermediate molding blocks 6, 5 by the right locking means 18, separating by the mold positioning system 3 the left and intermediate molding blocks 4, 5 and retaining the first left plastic component 22 on the first left general mold cavity part 7, and ejecting the second left product 23.

Rotating revolvable section 26 of the left molding block 4 pivoting around the center axis 28 of the injection molding by the mold positioning system 3 molding blocks 4, 5, 6 so that the first left general mold cavity part 7 is connected with the second left gated mold cavity part 9 to form a second left mold cavity 32 which encompasses the first left plastic component 22, and so that the second left general mold cavity part 15 is connected with the first left gated mold cavity part 8 to form a third left mold cavity 31.

Figure 5:
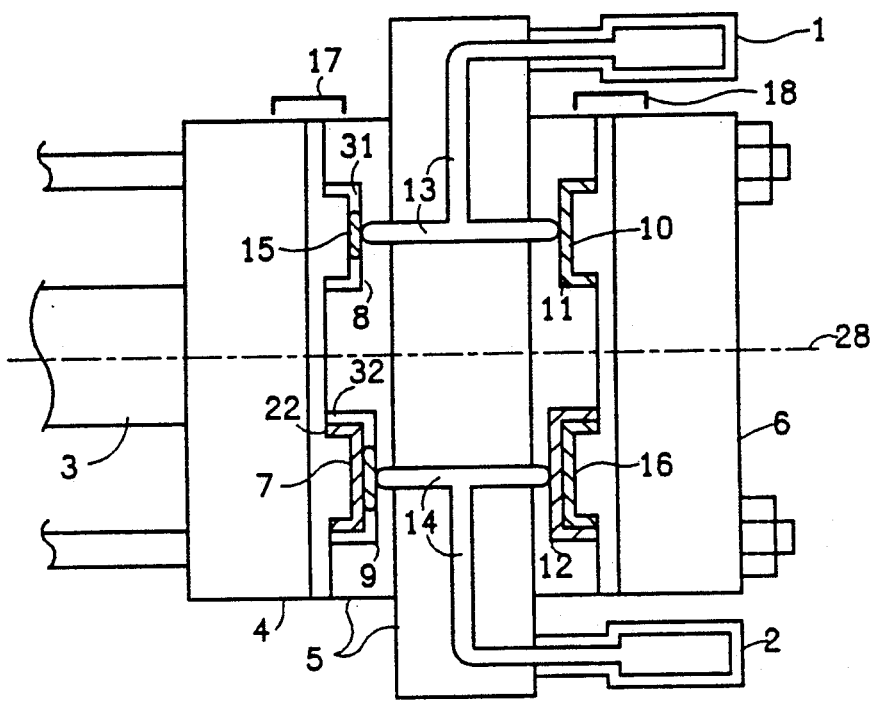

FIG. 5. Injecting by the first injection system 1 via the first runner system 13 first fluid plastic material into the third left mold cavity 31, and solidifying the material, to produce a second left plastic component 22a and approximately at the same time injecting by the second injection system 2 via the second runner system 14 a second fluid plastic material into the second left mold cavity 32, so that the second fluid plastic is united with the first left plastic component 22 and solidifying the material to mold a first left multicomponent plastic product 23a.

Figure 6:
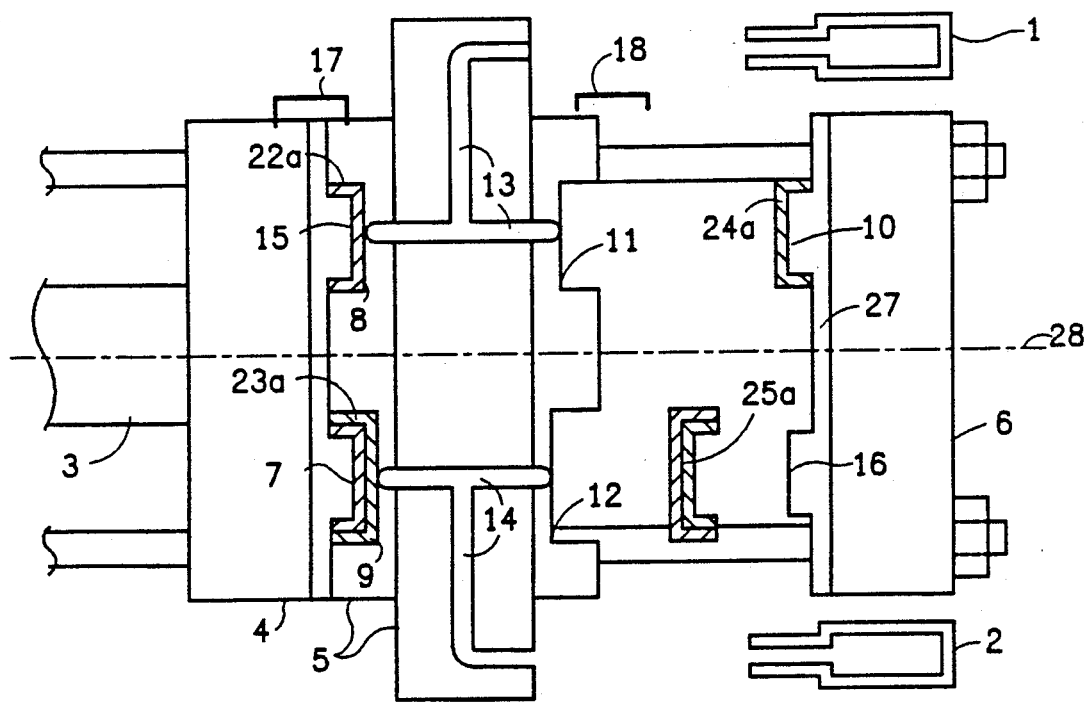

FIG. 6. While locking together the left and intermediate molding blocks 4, 5 by the left locking means 17, separating by the mold positioning system 3 the right and intermediate molding blocks 6, 5 and retaining the first right plastic component 24a on the first right general mold cavity part 10, and ejecting second right product 25a.

Rotating revolvable section 27 of the right molding block 6 pivoting around the center axis 28 of the injection molding system by a right rotational means, not shown, and combining by the mold positioning system 3 molding blocks 4, 5, 6 so that the second right general mold cavity part 16 is connected with the first right gated mold cavity part 11 to form a third right mold cavity 33, and so that the first right general mold cavity part 10 is connected with the second right gated mold cavity part 12 to form a second right mold cavity 34, which encompasses the second right plastic component 24a.

Figure 7:
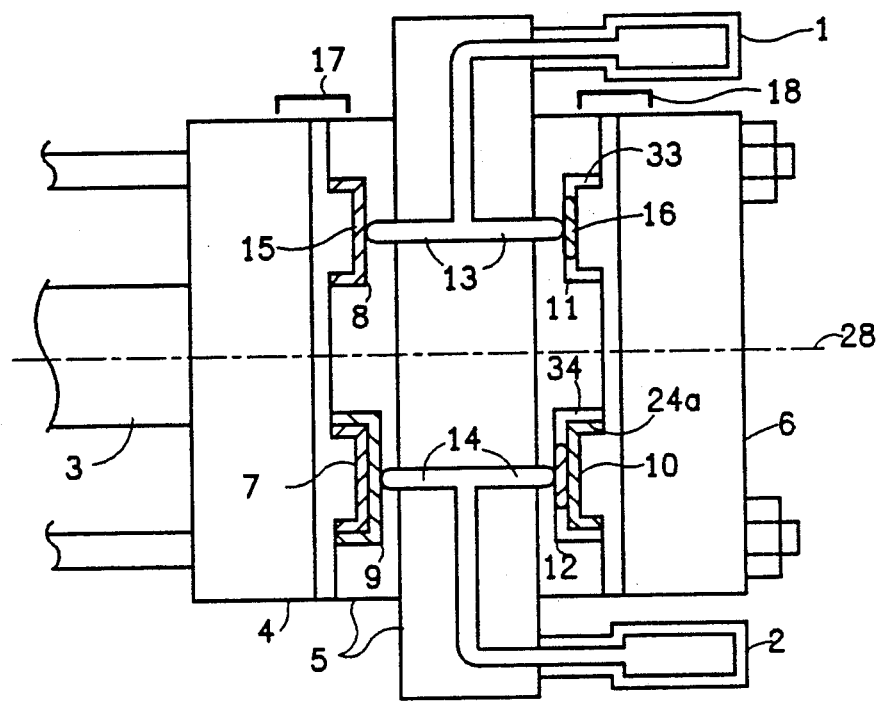

FIG. 7. Injecting by the first injection system 1 via the first runner system 13 first fluid plastic material into the third right mold cavity 33, and solidifying the material to produce a second right plastic component 24b and approximately at the same time injecting by the second injection system 2 via the second runner system 14 second fluid plastic material into the second right mold cavity 34 so that the second fluid plastic is united with the first right plastic component 24a and solidifying the material to mold a first right multicomponent plastic product 25b.

Figure 8:
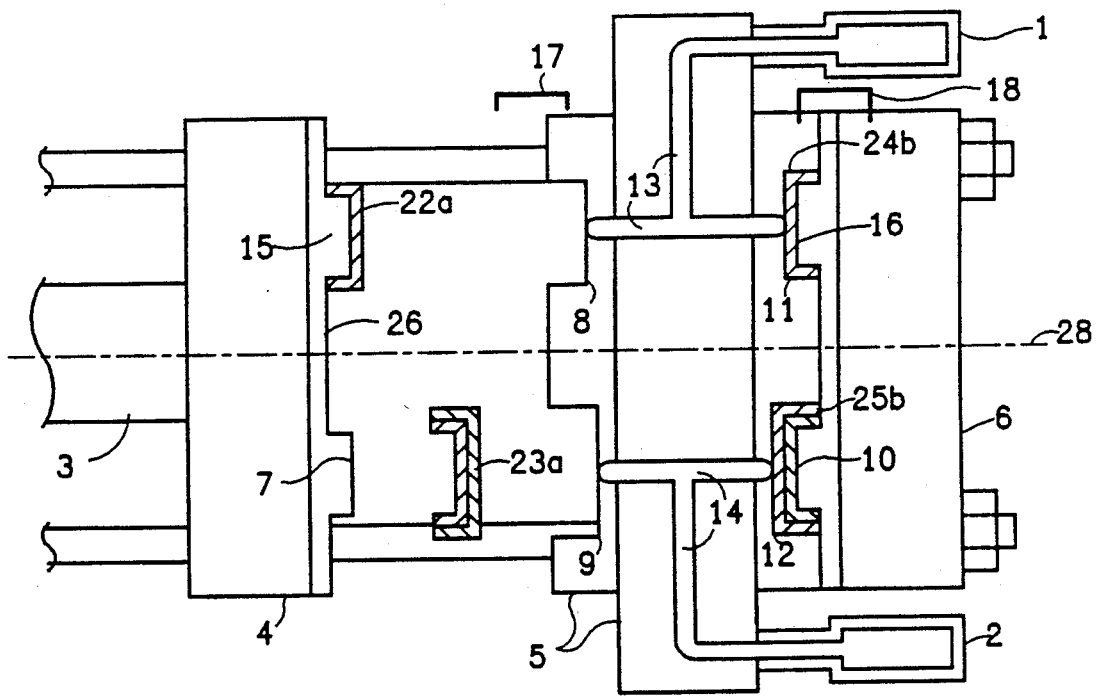

FIG. 8. While locking together the right and intermediate molding blocks 6, 5 by the right locking means 18, separating by the mold positioning system 3 to the left and intermediate molding blocks 4, 5 and retaining the second left plastic component 22a on the second left general mold cavity part 15, and ejecting the first left product 23a.

Rotating revolvable section 26 of the left molding block 4 pivoting around the center axis 28 of the injection molding system by a left rotational means, not shown, and combining by the mold positioning system 3 molding blocks 4, 5, 6 to obtain the same mold position as described in the beginning of the production cycle.

While the above description contains many specificities, these should not be construed as limitations on the scope of the invention, but rather a exemplifications of the preferred embodiment thereof. Many other variations are possible.

There may be more than two injection units used and more than three molding blocks, with one more injection unit and one more molding block, three component products may be made. With two more injection units and two more molding blocks, four component products may be made. The molding blocks may be operated in such a fashion that two stack-molds are disposed for axial movement in respect to each other. The injection units may be placed in many different constellations, vertically, horizontally, along the machine axis or perpendicular thereto, or different angels altogether. When using a standard injection molding machine for the method of the invention, the injection units will normally have to be separated from the intermediate molding block at some period of the production cycle, but it is possible to operate the invention with the injection units attached to the intermediate molding block.

If it is necessary to apply hold pressure during a period when an injection unit is detached from the intermediate molding block, it is possible to apply hold pressure to a runner system by constricting the runner system and applying alternative hold pressure by a piston means.

The opening and closing periods may be different from the preferred embodiment, it is for example possible for the left side to open two or three times every time the right side opens once. It is possible to produce a different product in the left side and the right side, as for example a container and a lid both needing two barrier materials for such properties as moisture, oxygen, carbon dioxide, solutions, and air, for products such as foods, carbonated drinks, paints and vacumated blood tubes.

The runner systems may consist of forked or unconnected sections or sections separated by valves of many types. It may be useful to include a controlled valve near or at the gate to each product, although this feature is optional. To start up the system without such valves, either double material is injected the first time or a previously produced product is inserted in half of the mold cavities.

There may be any convenient amount of general mold cavity parts which in turn is exposed to the gated mold cavity parts. If for example there are three general and two gate mold cavity parts, the extra general mold cavity part may be used as a separate station for printing or in line blow molding or the like.

I claim:

1. A method of cyclic injection molding a multicomponent product in an injection molding system comprising a mold positioning system, a first injection system and a second injection system, and a left molding block, a right molding block and an intermediate molding block located between the left and the right molding blocks, said blocks being disposed along a common axis for axial movement in respect to each other, the left molding block defining a first left general mold cavity part and the intermediate molding block defining a first left gated mold cavity part and a second left gated mold cavity part, the right molding block defining a first right general mold cavity part and the intermediate molding block defining a first right gated mold cavity part and a second right gated mold cavity part, the intermediate molding block defining a first runner system and a second runner system connected to said gated mold parts, the method comprising the steps of (a) combining by the mold positioning system said molding blocks so that the first left general mold cavity part is connected with the first left gated mold cavity part to form a first left mold cavity, (b) injecting by the first injection system via the first runner system a first fluid plastic material into the first left mold cavity, and solidifying the material to produce a first left plastic component, (c) separating by the mold positioning system the right and center molding blocks, (d) combining by the mold positioning system said molding blocks so that the first right general mold cavity part is connected with the first right gated mold cavity part to form a first right mold cavity, (e) injecting by the first injection system via the first runner system first fluid plastic material into the first right mold cavity, and solidifying the material to produce a first right plastic component, (f) separating by the mold positioning system the left and center molding blocks, retaining the first left plastic component on the first left general mold cavity part, (g) combining by the mold positioning system said molding blocks so that the first left general mold cavity part is connected with the second left gated mold cavity part to form a second left mold cavity, which encompasses said first left plastic component, (h) injecting by the second injection system via the second runner system a second fluid plastic material into the second left mold cavity so that the second fluid plastic is united with the first left plastic component and solidifying the material to mold a first left multicomponent plastic product, (i) separating by the mold positioning system the right and center molding blocks, retaining the first right plastic component on the first right general mold cavity part, (j) combining by the mold positioning system said molding blocks so that the first right general mold cavity part is connected with the second right gated mold cavity part to form a second right mold cavity, which encompasses said first right plastic component, (k) injecting by the second injection system via the second runner system second fluid plastic material into the second right mold cavity so that the second fluid plastic is united with the first right plastic component and solidifying the material to mold a first right multicomponent plastic product, (l) separating by the mold positioning system the left and center molding blocks, to eject the first left product molded in step (h), wherein step (c) comprises the step of (m) ejecting a first right product molded in step (k) of the preceding molding cycle.

2. A method according to claim 1 wherein the left molding block defines at least one second left general mold cavity part and the right molding block defines at least one second right general mold cavity part, and comprising the steps of wherein step (g) comprises the step of (n) combining by the mold positioning system said molding blocks so that one of said at least one second left general mold cavity parts is connected with the first left gated mold cavity part to form a third left mold cavity, wherein step (h) comprises the step of (o) injecting by the first injection system via the first runner system first fluid plastic material into the third left mold cavity, and solidifying the material to produce a second left plastic component, wherein step (i) comprises the step of (p) separating by the mold positioning system the right and center molding blocks, wherein step (j) comprises the step of (q) combining by the mold positioning system said molding blocks so that one of said at least one second right general mold cavity parts is connected with the first right gated mold cavity part to form a third right mold cavity, wherein step (k) comprises the step of (r) injecting by the first injection system via the first runner system first fluid plastic material into said third right mold cavity, and solidifying the material to produce a second right plastic component, wherein step (l) comprises the step of (s) separating by the mold positioning system the left and center molding blocks, retaining the second left plastic component on said one of said at least one second left general mold cavity parts, wherein step (a) of the following cycle comprises the step of (t) combining by the mold positioning system said molding blocks so that any one of said at least one second left general mold cavity parts is connected with the second left gated mold cavity part to form a fourth left mold cavity, which encompasses said second left plastic component, wherein step (b) of the following cycle comprises the step of (u) injecting by the second injection system via the second runner system second fluid plastic material into the fourth left mold cavity so that the second fluid plastic is united with the second left plastic component and solidifying the material to mold a second left multicomponent plastic product, wherein step (c) of the following cycle comprises the step of (v) separating by the mold positioning system the right and center molding blocks, retaining the second right plastic component on said any one of said at least one second right general mold cavity parts, wherein step (d) of the following cycle comprises the step of (w) combining by the mold positioning system said molding blocks so that said any one of said at least one second right general mold cavity parts is connected with the second right gated mold cavity part to form a fourth right mold cavity, which encompasses said second right plastic component, wherein step (e) of the following cycle comprises the step of (x) injecting by the second injection system via the second runner system second fluid plastic material into the fourth right mold cavity so that the second fluid plastic is united with the second right plastic component and solidifying the material to mold a second right multicomponent plastic product, wherein step (f) of the following cycle comprises the step of (y) separating by the mold positioning system the left and center molding blocks, to eject the second left product molded in step (u), wherein step (p) comprises the step of (z) ejecting a second right product molded in step (e).

3. A method according to claim 2 wherein the method utilizes only one second left general mold cavity part and the method utilizes only one second right general mold cavity part.

* * * * *